United States Patent [19]

Hruby et al.

[11] Patent Number: 4,581,677
[45] Date of Patent: Apr. 8, 1986

[54] LAYERED CAPACITIVE SENSOR FOR DETECTING LOADS AND LOAD VARIATIONS THEREON

[76] Inventors: Enzo Hruby; Raffaello Vizzotto, both of Via Teodorica 19/1, Milano, Italy

[21] Appl. No.: 587,812

[22] Filed: Mar. 9, 1984

[30] Foreign Application Priority Data

Mar. 24, 1983 [IT] Italy ............................. 20274 A/83

[51] Int. Cl.⁴ ................... G01G 3/14; H01G 3/175; H01G 7/00
[52] U.S. Cl. ................. 361/283; 177/210 C; 361/323
[58] Field of Search ............... 361/283, 323; 177/210 C

[56] References Cited

U.S. PATENT DOCUMENTS

| | | | |
|---|---|---|---|
| 3,565,195 | 2/1971 | Miller et al. | 177/210 C |
| 3,678,378 | 7/1972 | Trott et al. | 177/210 C X |
| 3,806,775 | 4/1974 | Edman | 361/323 X |
| 3,875,481 | 4/1975 | Miller et al. | 361/283 |
| 4,102,422 | 7/1978 | Christiansson | 177/210 C |
| 4,381,788 | 5/1983 | Douglas | 361/283 X |
| 4,520,885 | 6/1985 | Jeffrey | 177/210 C |

*Primary Examiner*—Donald Griffin
*Attorney, Agent, or Firm*—Bucknam and Archer

[57] ABSTRACT

There is disclosed a layered capacitive sensor for detecting loads and load variations thereon comprising two outer protective layers, a first electrically conductive layer, a first electrically insulating layer, a second electrically conductive layer, a second electrically insulating layer, and a third electrically conductive layer, the several layers being supplied in roll or coil form and cut to the desired size. In particular the electrically conductive layers are made of a metal, while the insulating layers are made of yieldable expanded polyethylene.

1 Claim, 4 Drawing Figures

LAYERED CAPACITIVE SENSOR FOR DETECTING LOADS AND LOAD VARIATIONS THEREON

BACKGROUND OF THE INVENTION

The present invention relates to a device, which in its most commonly occuring but not critical practice is generally laid "underground", although not limited thereto. The inventive device is set up to warn of any disturbance, whether temporary or otherwise, resulting from the application of a moving or stationary gravity load. The device of this invention would be typically utilized to issue warning signals on heavy masses passing by it. The present invention relates generally to related circuitry (known per se) for operating the device.

Known in the pertinent art are, as far as the Inventors are aware, devices of the same type as specified above or their equivalents. For example, various arrangements are known which are based on detection of capacitive changes, which arrangements may, for instance, include at least one pair of conductors positioned at a suitable distance apart and being jointly effective to issue a signal. For example, a means is known, such as pressurized tubes, which are responsive to pressure changes or other phenomena, and occasionally also to vibratory states. In the same field of this invention, for example, a means is known, but not limited thereto, which falls within the class of so-called "inertial sensors", seismic sensors, geophones, and the like.

Such prior means may utilized a variety of phenomena, such as a change in the amplitude of the frequency being received, a pressure change which is detected by a pipe system containing a high pressure liquid, and systems associated with suitable piezoelectric sensors. Also known are seismic sensors which are practically inertial systems and detect mass movements to issue electric signals.

Such prior means or systems are subjected to a number of limitations concerning their installation, and the electronic or non-electronic picking up and/or handling of the detected signals. A further limitation as, for example, is the practical impossibility of recognizing or discriminating a seismic wave which may be originated far away from a more local mass movement, which would only justify a signal proper or emergency warning.

SUMMARY OF THE INVENTION

According to the invention, the system or device (in the broadest meaning of the term) is characterized by a continuous level polarization, that is one wherein alternating currents at any frequency are absent. In practice, the device according to this invention may be defined as operating on the principle of a direct current capacitive system. According to a more specific feature of the invention, this capacitive system may be viewed as a huge polarized capacitor.

According to another complementary feature of the invention, virtually instantaneous changes of state are detected for signalling purposes, the system being readily returned to rest, and resuming at once a required condition to detect further changes irrespective of the previous state.

BRIEF DESCRIPTION OF THE DRAWINGS

These and other more specific features of the invention will be apparent from the following detailed description of some possible embodiments of this system, given herein by way of example and not of limitation with reference to the accompanying drawings, where.

DESCRIPTION OF A PREFERRED EMBODIMENT

Figure 4:
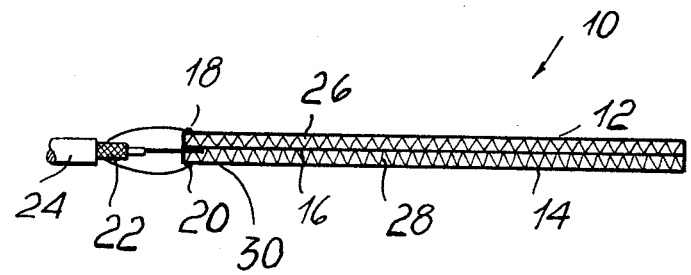
FIG. 4 illustrates the "construction" of the sensor, to be discussed hereinafter.

Making reference to the drawing views, and initially to FIG. 4, this sensor is generally indicated at 10.

The sensor 10 is basically constructed from at least three metal layers, namely two outer layers 12 and 14, respectively, forming a screening shield for protecting the sensor against interference, radio-electric noise, electric discharges, and stray currents. The structure is completed by at least one inner layer 16, which is known in the art as the "hot side".

Said layers 12 and 14, which are interconnected, would be electrically insulated from the core layer 16. The outer layers are advantageously formed from a metal material, or electrically conductive material, and interconnected at 18 and 20, and optionally at other locations as well, depending on the size of the "blanket" or manufacturing and installation requirements of the system.

Said layers 12 and 14, preferably but not critically, are also connected to the shield 22 of a connection cable or lead 24 to the "analyzer" electric device proper. The gaps 26 and 28 between the conductive layers 12 and 14, as well as the intervening "hot side" metal layer 16, are critically insulating ones to materialize together the dielectric arrangement.

Of preference, the layers 26 and 28 are, or may be regarded as being, "yielding" ones, at least within the required limits to enable the sensor to detect any loads, and especially variations thereof, for further processing in a suitable electronic unit, known per se, which is connected to the lead 24.

Figure 3:
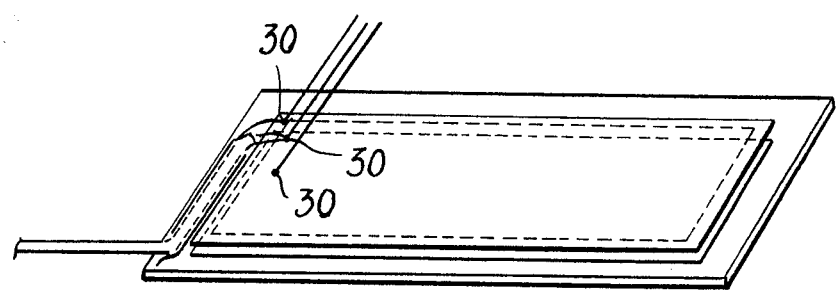
FIG. 3 is a diagramatic perspective view of a schematic completed sensor, in particular as set up for installation.

Clearly shown in FIG. 3 are "welded spots" (which correspond operativelly and functionally to the points 18, 20 and 30).

For installing the sensor, the insulating layers 26 and 28 (FIG. 4) may be fabricated from a variety of materials, such as for example polyethylene structures incorporating air bubbles. Other feasible materials may be conventional packaging materials, for obvious reasons of availability and economy.

Figure 1:
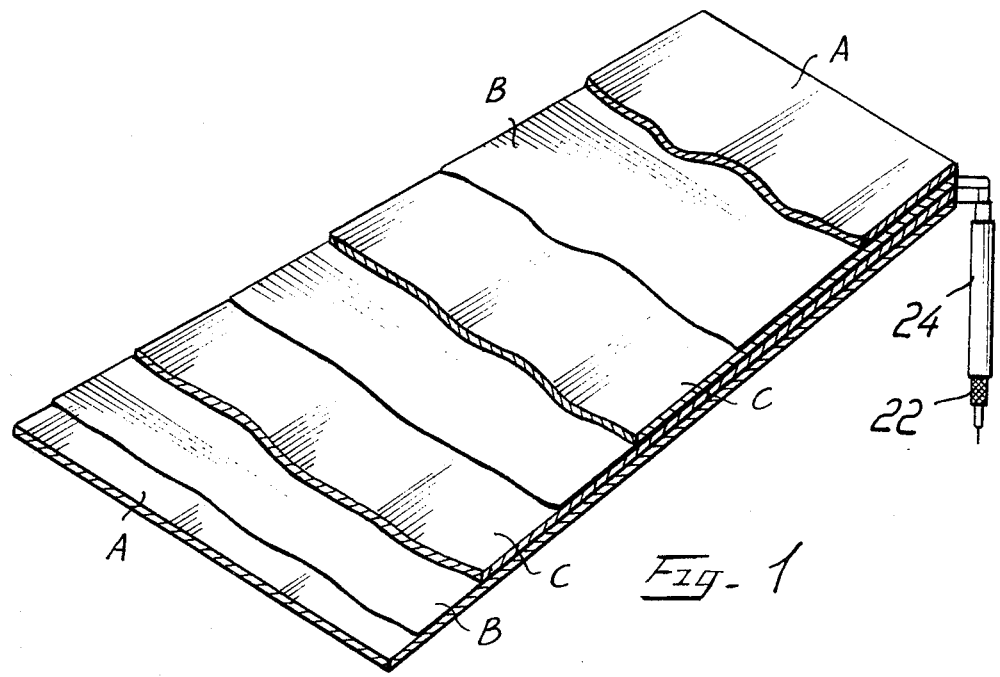
FIG. 1 shows diagramatically and in a roughly perspective view a typical possible ply structure of the sensor materializing the inventive device.

As illustrated in the drawing views, and particularly in FIG. 1 thereof, this layered structure comprises externally protective coatings A. It also comprises, in the same order, conductive materials B and insulating layers C, which together materialize the sensor, practically in the form of a variable capacitance capacitor.

Figure 2:
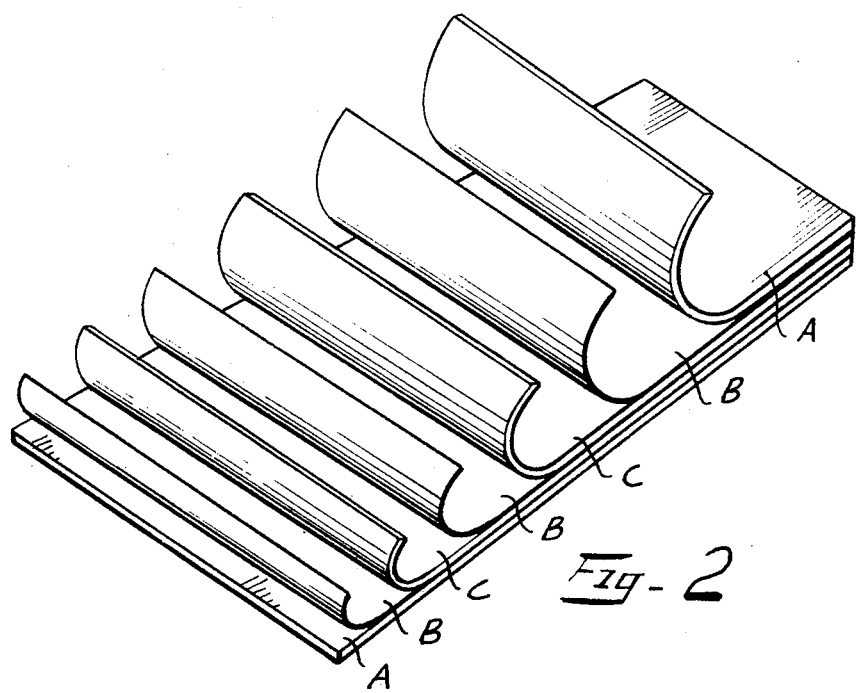
FIG. 2 is a generally similar view showing one possible embodiment of the sensor as set up for installation as a composite sensor.

From a more closely manufacturing standpoint, the sensor of this invention is fabricated as shown nonlimitatively on FIG. 2 by a superimposition of layers, designated with the above-specified reference characters, the various layers being generally, and if desired, supplied in rolls or coils, and then suitably combined together, in the same order, for the formation of a composite article which is easy to transport and install.

In particular, but not exclusively, installation would provide for the system to be laid "underground" at a convenient or desired depth contingent on local conditions, load responsiveness (transient or permanent loads) requirements, or else.

However, since the invention has been described and illustrated by way of example only, it may be appreciated that many modifications and alterations could be introduced without departing from the scope of any individual or combined ones of the appended claims.

We claim:

1. A layered capacitive sensor for detecting loads and load variations thereon, comprising a layered structure including a first outer protective coating, a first electrically conductive layer, a first electrically insulating layer, a second electrically conductive layer, a second electrically insulating layer, a third electrically conductive layer and a second outer protective coating, said layer being effective to be supplied in roll or coil form and cut to the desired size, said electrically insulating layers being made of expanded yieldable polyethylene, and said electrically conductive layers being made of a metal and electrically connected to one another and provided for connection to the shield of an electric analyzer and processing device.

* * * * *